United States Patent [19]
Sydansk

[11] Patent Number: 5,816,323
[45] Date of Patent: Oct. 6, 1998

[54] PERMEABILITY REDUCTION IN A HYDROCARBON-BEARING FORMATION USING A STABILIZED POLYMER GEL

[75] Inventor: Robert D. Sydansk, Littleton, Colo.

[73] Assignee: Marathon Oil Company, Findlay, Ohio

[21] Appl. No.: 718,798

[22] Filed: Sep. 24, 1996

[51] Int. Cl.⁶ .................................................. E21B 33/138
[52] U.S. Cl. .......................... 166/295; 166/300; 507/903
[58] Field of Search ..................................... 166/295, 270, 166/269, 279, 296, 300; 507/225, 903, 935

[56] References Cited

U.S. PATENT DOCUMENTS

| | | | |
|---|---|---|---|
| 3,762,476 | 10/1973 | Gall | 166/294 |
| 4,410,043 | 10/1983 | Hall et al. | 166/273 |
| 4,624,795 | 11/1986 | Dawson et al. | 252/8.553 |
| 4,636,572 | 1/1987 | Hudson et al. | 556/2 |
| 4,683,949 | 8/1987 | Sydansk et al. | 166/270 |
| 4,706,754 | 11/1987 | Smith | 166/295 |
| 5,133,408 | 7/1992 | Tackett | 166/270 |
| 5,259,455 | 11/1993 | Nimerick et al. | 166/308 |
| 5,421,411 | 6/1995 | Sydansk | 166/295 |
| 5,431,226 | 7/1995 | Sydansk | 166/295 |
| 5,609,208 | 3/1997 | Sydansk | 166/295 |
| 5,650,379 | 7/1997 | Sydansk | 507/27 |

FOREIGN PATENT DOCUMENTS

| | | | |
|---|---|---|---|
| 0174053 B1 | 4/1988 | European Pat. Off. | C04B 28/04 |

*Primary Examiner*—Frank Tsay
*Attorney, Agent, or Firm*—Jack L. Hummel; Jack E. Ebel

[57] ABSTRACT

A process and composition are provided for permeability reduction in a hydrocarbon-bearing formation to improve hydrocarbon recovery therefrom. The process includes placement of a crosslinked polymer gel in the treatment region preceded by surface preparation of a gelation solution which is the gel precursor. The gelation solution contains a crosslinkable polymer, a chromium(III)/carboxylate complex crosslinking agent, an inorganic fluoride salt stabilizing agent and an aqueous solvent containing hard salts. The gel is placed in the treatment region by injecting the gelation solution into a well bore in fluid communication with the formation, displacing the gelation solution into the desired treatment region and gelling the solution to completion forming the permeability-reducing gel in situ. The inorganic fluoride salt stabilizing agent promotes the long-term stability of the gel in the treatment region, particularly at high temperatures.

29 Claims, No Drawings

PERMEABILITY REDUCTION IN A HYDROCARBON-BEARING FORMATION USING A STABILIZED POLYMER GEL

BACKGROUND OF THE INVENTION

1. Technical Field:

The invention relates to a process for recovering hydrocarbons from a subterranean formation, and more particularly to a hydrocarbon recovery process using a permeability-reducing agent.

2. Background Information:

The utility of crosslinked polymer gels as a permeability-reducing agent in subterranean hydrocarbon-bearing formations to facilitate hydrocarbon recovery therefrom has long been known in the art. U.S. Pat. No. 3,762,476 to Gall is representative of conventional teaching in the art of its time. Gall discloses a conformance improvement treatment process, wherein a permeability-reducing crosslinked polymer gel is formed in situ by injecting an aqueous slug containing a crosslinkable water-soluble polymer into the subterranean treatment region followed in sequence by an aqueous slug containing a crosslinking agent made up of a polyvalent metal cation complexed with a retarding anion. Useful polyvalent metal cations listed in Gall include iron(II), iron(III), aluminum(III), chromium(III), calcium(II), magnesium(II). Useful retarding anions complexed with the cation include citrate, phosphate, acetate, nitrilotriacetate, and tartrate.

Sequential injection of the gel components as separate and distinct slugs into the treatment region is essential to the teaching of treatment processes such as Gall insofar as surface contacting of the polymer and crosslinking agent was believed to cause premature gelation of the gel components prior to reaching the treatment region. If prematurely formed at the surface or in the well bore, placement in the treatment region of the gels taught by Gall was difficult, if not impossible, to achieve. Consequently, sequential injection of the gel components in concept avoided premature gelation by delaying contacting of the components until they were displaced out into the treatment region formation. In situ contacting of the polymer and crosslinking agent as required by Gall, nevertheless, proved operationally unattractive in many hydrocarbon recovery applications because of the difficulty in achieving adequate mixing of the gel components in situ. Without adequate mixing, the gels of Gall were poorly formed, resulting in weak and unstable gels that performed ineffectively as permeability-reducing agents.

In response to the shortcomings of sequential injection processes such as Gall, U.S. Pat. No. 4,683,949 to Sydansk et al identified specific gel components and gelation parameters for a crosslinked polymer gel having utility in a conformance improvement treatment process, whereby the polymer and crosslinking agent of the gel could be mixed at the surface in a homogeneous gelation solution and placed in the treatment region by injection therein as a single slug. Thus, Sydansk et al overcame the inherent operational limitations of processes such as Gall that required sequential injection and in situ mixing of the gel components. Sydansk et al was predicated on the finding that a chromium(III)/carboxylate complex crosslinking agent could be mixed with a crosslinkable polymer at the surface to form a gelation solution producing gels that were uniquely stable, highly predictable and, therefore, capable of practical long-term stability in subterranean treatment regions.

The teaching of Sydansk et al has subsequently been modified to adapt the teaching to certain problematic treatment applications. For example, in some high temperature or far well bore applications, it has been found that the chromium(III)/carboxylate complex taught by Sydansk et al excessively crosslinks the polymer before the gelation solution reaches the desired treatment region, increasing the difficulty of placing the gel in the treatment region. U.S. Pat. No. 4,706,754 to Smith addresses such problematic treatment applications, wherein longer gel times are advantageously provided by adding a supplemental delaying agent in the form of a carboxylic acid to the gelation solution. U.S. Pat. No. 5,421,411 to Sydansk similarly discloses a supplemental delaying agent in the form of a carboxylate salt.

Another problematic treatment application exists where practical considerations dictate the use of hard water, such as brines, as the aqueous solvent of the gelation solution. This exigency frequently occurs in high volume applications at offshore or arid production sites where it is impractical to use fresh water as the aqueous solvent of the gelation solution. An exemplary high volume application is the permeability-reducing gel treatment of highly fractured formations to improve conformance therein. The presence of hard salts, and particularly calcium salts, at relatively high concentrations in the aqueous solvent of the gelation solution tends to destabilize the resulting gel over time, especially in high temperature formations. Gel destabilization in high temperature formations is attributable to the hardness of the calcium cations and polymer autohydrolysis. As such, a need exists for an effective stabilizing agent for a gel formed from a gelation solution containing an aqueous solvent having a relatively high degree of hardness, wherein the stabilizing agent enables long-term stability of the gel when placed in a subterranean treatment region, and particularly when placed in a high temperature subterranean treatment region.

It is, therefore, an object of the present invention to provide a process that forms a crosslinked polymer gel for permeability reduction in a subterranean hydrocarbon-bearing formation. It is also an object of the present invention to provide a gelation solution composition that forms such a crosslinked polymer gel. It is more particularly an object of the present invention to form a gel from a gelation solution that includes an aqueous solvent having a relatively high degree of hardness. It is a further object of the present invention to stabilize the gel by supplementing the gelation solution with a stabilizing agent. It is another object of the present invention to form a stabilized gel having long-term utility as a permeability-reducing agent. It is yet another object of the present invention to form a stabilized gel having long-term utility in a high temperature formation. It is still another object of the present invention to form a stabilized gel for placement in fractures of a formation exhibiting large-volume fracture conformance problems.

SUMMARY OF THE INVENTION

The present invention is a process and composition for improving hydrocarbon recovery from a subterranean hydrocarbon-bearing formation penetrated by a well bore. Improved hydrocarbon recovery is effectuated in accordance with the invention by employing a specific composition to reduce permeability within a desired treatment region of a subterranean formation penetrated by a fluid injection well bore or a hydrocarbon production well bore. Encompassed within the scope of the invention are conformance improvement treatment, fluid shutoff treatment (including water or gas shutoff treatment), zone abandonment, coning treatment, squeeze cement treatment, and well bore completion applications.

The present process, in each of its above-recited applications, requires placement of a crosslinked polymer gel in a desired treatment region of the formation to act as a permeability-reducing agent therein. Placement of the gel is preceded by preparation of a gelation solution at the surface which is a precursor to the gel. The gelation solution contains a crosslinkable polymer, a chromium(III)/ carboxylate complex crosslinking agent, an inorganic fluoride salt stabilizing agent and an aqueous solvent having a relatively high degree of hardness, and in particular, having a relatively high calcium cation concentration. In a further embodiment, the present invention is the composition of the above-recited gelation solution.

The gel is placed in the desired treatment region by injecting the gelation solution as a single homogeneous slug into a well bore in fluid communication with the hydrocarbon-bearing formation. The gelation solution is displaced into the desired treatment region and gelled to completion forming a permeability-reducing gel therein. The stability of the gel is believed to be maintained by associating the stabilizing agent in the gelation solution with the hardness producing cations in the solvent to inhibit the cations from destabilizing the gel. The stabilized gel has particular utility in treatment regions exhibiting relatively high temperatures and/or fracture conformance problems.

DESCRIPTION OF PREFERRED EMBODIMENTS

A number of specific terms are used throughout the specification to describe the process of the present invention and are defined as follows. A "subterranean hydrocarbon-bearing formation" is a subterranean geological structure consisting essentially of "matrix," and in some instances, "anomalies." The term "subterranean hydrocarbon-bearing formation" is synonymous with the term "reservoir." An "anomaly" is a volume within a formation having very high permeability relative to the matrix. The term "anomaly" is inclusive of such highly permeable volumes as fractures, fracture networks, joints, cracks, fissures, vugs, voids, solution channels, caverns, washouts, cavities, and the like. The "matrix" is generally characterized as substantially continuous, sedimentary geological material having a very low permeability relative to an anomaly. In addition, the matrix is often characterized as competent.

The term "well bore" is defined as a bore hole extending from the earth surface to the subterranean hydrocarbon-bearing formation. Thus, a well bore is a conduit providing fluid communication between the surface and the subterranean hydrocarbon-bearing formation penetrated thereby. A production well bore enables the removal of fluids from the subterranean hydrocarbon-bearing formation to the surface and an injection well bore enables the placement of fluids into the subterranean hydrocarbon-bearing formation from the surface. It is noted that a given well bore can function interchangeably as a production well bore or an injection well bore depending on whether a fluid is being removed from or placed into the well bore. The term "well" is synonymous with the term "well bore." Other terms used herein have definitions in accordance with the conventional usage of a skilled artisan, unless otherwise defined hereafter.

The process of the present invention comprises preparing a flowing liquid gelation solution at the earthen surface, injecting the gelation solution into a well bore in fluid communication with a subterranean hydrocarbon-bearing formation, displacing the gelation solution into a desired treatment region of the formation and gelling the solution in situ, thereby placing a permeability-reducing gel in the treatment region. As such, the gelation solution is a gel precursor that is transformable from a solution to a gel after being aged to maturity for a predetermined gel time. A "gel" is defined herein as a continuous three-dimensional crosslinked polymeric network integrating a liquid into the interstices of the network.

The gelation solution comprises a crosslinkable polymer, a crosslinking agent, a stabilizing agent in solution within an aqueous solvent, and optionally, a gelation-rate retarding agent. Crosslinkable polymers are well known in the art and any such water-soluble carboxylate-containing polymer, whether a biopolymer or a synthetic polymer, has utility in the gelation solutions of the present invention.

Water-soluble carboxylate-containing biopolymers having utility herein include polysaccharides and modified polysaccharides, such as xanthan gum, guar gum, succinoglycan, scleroglycan, polyvinylsaccharides, carboxymethylcellulose, ocarboxychitosans, hydroxyethylcellulose, hydroxypropylcellulose, and modified starches.

Water-soluble carboxylate-containing synthetic polymers having utility herein are preferably acrylamide polymers. Acrylamide polymers are polymers having one or more acrylamide groups and include polyacrylamide (PA), partially hydrolyzed polyacrylamide (PHPA), copolymers of acrylamide and acrylate, and terpolymers and tetrapolymers of acrylamide. PA, as defined herein, has from about 0% to about 3% of its amide groups hydrolyzed. Although 0% hydrolyzed PA initially lacks any carboxylate groups, it generates carboxylate groups under the conditions of the present process, thereby satisfying the definition of carboxylate-containing polymers having utility within the scope of the present invention. PHPA has greater than about 3% of its amide groups hydrolyzed and less than 100% of its amide groups hydrolyzed. The average molecular weight of an acrylamide polymer having utility herein is generally in a range between about 10,000 and about 50,000,000, preferably between about 150,000 and about 30,000,000, and most preferably between about 200,000 and about 20,000,000.

Crosslinking agents having utility in the present gelation solution are water-soluble complexes containing a reactive transition metal cation and an organic carboxylate anion. The term "carboxylate anion" as used herein encompasses carboxylate anionic species including mono-carboxylate anions, such as acetate and propionate, poly-carboxylate anions, such as malonate, and substituted derivatives of carboxylate anions, such as glycolate and lactate. The carboxylate anions are generally obtained from the corresponding acids or salts thereof. Preferred among such crosslinking agents are those including one or more chromium(III) cations complexed with one or more carboxylate anions. An example of a preferred crosslinking agent is one or more chromium(III) cations complexed with one or more acetate anions, as taught in U.S. Pat. No. 4,683,949 which is incorporated herein by reference.

Stabilizing agents having utility in the gelation solution of the present invention are inorganic water-soluble salts of fluoride anions. Preferred stabilizing agents in the practice of the present invention are simple salts of fluoride anions. Among the preferred stabilizing agents are sodium fluoride, ammonium fluoride, and potassium fluoride.

Optional gelation-rate retarding agents having utility in the present gelation solution are conventional retarding agents including carboxylic acids taught by U.S. Pat. Nos.

4,706,754; 5,131,469; 5,143,958; 5,219,475; and 5,219,476, incorporated herein by reference. Such carboxylic acids include acetic acid, propionic acid, lactic acid, malonic acid and glycolic acid. Retarding agents having utility herein also include the carboxylate salts of the above-recited carboxylic acids, including ammonium, potassium or sodium salts of acetate, propionate, lactate, malonate or glycolate.

Alternatively, delayed gelation can be achieved while excluding the optional retarding agent from the gelation solution by employing a decarboxylated crosslinking agent in the gelation solution in the manner of U.S. Pat. No. 5,431,226, incorporated herein by reference. Accordingly, the term "crosslinking agent" as used herein to describe gelation solution components includes conventional crosslinking agents and polycarboxylate precursors of conventional mono-carboxylate crosslinking agents that are decarboxylated to the conventional mono-carboxylate crosslinking agent in situ at high temperature.

The aqueous solvent of the gelation solution is an aqueous liquid capable of forming a solution with the selected polymer, crosslinking agent, stabilizing agent, and optional retarding agent. The term "solution" as used herein, in addition to true solutions, is intended to broadly encompass dispersions, emulsions, or any other homogeneous mixture of the gelation solution components in the aqueous solvent. The solvent has a high degree of hardness, defined herein as having a hard salt concentration of at least about 50 ppm, wherein hard salts are salts of calcium or magnesium. More particularly, the solvent has a calcium salt concentration of at least about 110 ppm, preferably between about 280 and about 170,000 ppm, and most preferably between about 550 and about 28,000 ppm. As such, the solvent correspondingly has a calcium cation concentration of at least about 40 ppm, preferably between about 100 and about 60,000 ppm, and most preferably between about 200 and about 10,000 ppm. The solvent is typically a brine satisfying the above-recited concentration parameters, such as sea water or a produced water from the subterranean formation.

The gelation solution is prepared by admixing all of the solution components, including the polymer, crosslinking agent, stabilizing agent and solvent, together at the surface to form a homogeneous injectable fluid. Surface admixing broadly encompasses batch mixing the components in bulk and subsequently injecting the resulting gelation solution into the well bore or simultaneously mixing the components in-line near the well head and injecting the gelation solution into the well bore. The order of mixing the solution components is not specific to the practice of the present invention. The polymer, crosslinking agent, stabilizing agent and optional retarding agent can initially be in a solid or liquid state. The crosslinking agent is added to the gelation solution in the form of a chromium(III)/carboxylate complex, wherein preferred forms of the chromium(III)/acetate complex crosslinking agent are solid $CrAc_3$, solid $CrAc_3.H_2O$, solid $Cr_3Ac_7(OH)_2$ or a solution labeled "Chromic Acetate 50% Solution" that is commercially available, for example, from McGean-Rohco Chemical Co., Inc., 50 Public Square, No. 1250, Cleveland, Ohio 44113, U.S.A. It is further noted that addition of the stabilizing agent to the gelation solution does not substantially alter the pH of the gelation solution.

The polymer concentration of the resulting gelation solution is generally at least about 500 ppm, preferably at least about 2,000 ppm, and most preferably within a range between about 5,000 ppm and about 100,000 ppm. The crosslinking agent concentration of the gelation solution is generally between about 44 ppm and about 88,000 ppm, and preferably between about 88 ppm and about 18,000 ppm. As such, the corresponding chromium(III) cation concentration of the gelation solution is generally between about 10 ppm and about 20,000 ppm, and preferably between about 20 ppm and about 4,000 ppm. The stabilizing agent concentration of the gelation solution is generally between about 50 ppm and about 30,000 ppm, and preferably between about 100 ppm and about 12,000 ppm. As such, the corresponding fluoride anion concentration of the gelation solution is generally between about 20 ppm and about 14,000 ppm, and preferably between about 45 ppm and about 5400 ppm.

The gelation solution of the present invention has utility in substantially any permeability-reduction treatment related to hydrocarbon recovery. Permeability-reduction treatments can be alternatively termed fluid flow capacity-reduction treatments, and include conformance improvement treatments, fluid shutoff treatments, zone abandonment treatments, coning treatments, well bore completion treatments, chemical liner completion treatments, squeeze and recompletion treatments, sweep improvement treatments, and squeeze cement treatments. The gelation solution of the present invention is most advantageously applicable to permeability-reduction treatments requiring placement of relatively high volumes of gel in a high temperature subterranean formation, wherein the gels are formulated with a hardness-containing aqueous solvent, insofar as such treatments produce gels that are more susceptible to instability over time. High volume treatments are frequently characterized by relatively low concentrations of polymer in the gelation solution rendering the polymer especially susceptible to destabilizing components, such as calcium ions, in the gelation solution at high temperatures. A high temperature environment compounds the instability of the gel because high temperatures favor the destabilizing autohydrolysis reaction of the polymer. High volume treatments are typically gelation solution volumes of at least about 100 barrels or more. High temperature formations typically have a temperature of at least about 70° C., preferably between about 80 and about 165° C. and most preferably between about 85 and about 155° C.

Although the present invention is not dependent on any specific mechanism, it is believed that the stabilizing agent maintains the long-term stability of the gel in situ by associating with the destabilizing components, i.e., calcium cations, present in the aqueous solvent and impeding their ability to detrimentally interact with the crosslinked polymer network structure of the gel. A stable gel is characterized herein as a gel that does not exhibit substantial loss of structure over time as evidenced by reduction in gel strength or expulsion of water, termed network breakdown or syneresis.

Conformance improvement treatments, and particularly sweep improvement treatments and water shutoff treatments, are generally high volume gel treatments when applied to fractured formations or far well bore regions of a formation. A far well bore region of a formation is a region extending radially at least 2 meters or more from the well bore, and preferably extending radially at least 3 meters or more from the well bore.

In the practice of a conformance improvement treatment, which includes sweep improvement treatments for injection well bores and water shutoff treatments for production well bores, the gelation solution is injected into a well bore penetrating the subterranean hydrocarbon-bearing formation. The gelation solution is displaced from the well bore into the desired treatment region that is often a region containing higher permeability matrix proximate to the lower permeability hydrocarbon-producing formation. The treatment region can alternatively be a high permeability anomaly in the hydrocarbon-producing formation or a region proximate thereto. The crosslinking agent of the gelation solution effectuates crosslinking between appropriate sites of the same or different polymer molecules to create the network structure of the gel. The terms "crosslinking", "gelling" and "gelation" are used synonymously herein. Partial crosslinking of the polymer by the crosslinking agent may occur in the gelation solution before the solution reaches the treatment region, but complete crosslinking resulting in gel formation often does not occur until at least a substantial portion of the gelation solution is in place in the treatment region.

In general, placement of a gel in less permeable matrix preferentially dictates selection of a gel having relatively limited structure. The degree of structure of the gel formulated in the manner of the present invention is inter alia a function of the polymer properties, the polymer concentration, and the degree and character of crosslinking in the gelation solution. The degree of structure of a gel containing an acrylamide polymer is usually increased by increasing the polymer concentration of the gelation solution. However, an oftentimes more cost-effective and preferred means for achieving the same effect is to employ a higher molecular weight polymer at a relatively fixed concentration and initial hydrolysis level. Conversely, a reduction in the degree of structure is achieved by using a lower molecular weight polymer. Thus, the skilled practitioner can modify the degree of structure of the present gel in the above-described manner to correspond with the permeability of the treatment region.

In any case, complete crosslinking is achieved when either substantially all of the reactable crosslinking agent or substantially all of the polymer crosslinking sites are consumed as the gelation solution is aged. Prior to complete crosslinking, the gelation solution is deemed flowing to the extent it is readily displacable from the well bore and through the formation. After complete crosslinking, the gelation solution is fully transformed to a gel that is at least more resistant to flow than the gelation solution and in many cases is non-flowing to the extent it has sufficient strength to resist propagation from the treatment region during subsequent normal well bore operations of hydrocarbon production or hydrocarbon recovery fluid injection.

Upon complete crosslinking, or complete gelation or gel maturation, as it is alternatively termed, a sufficient volume of the newly-formed gel resides in place within the treatment region to reduce the permeability thereof. Consequently, the gel enables hydrocarbon recovery fluids subsequently injected into the formation to more uniformly sweep the untreated hydrocarbon producing zone in preference to the treatment region. Alternatively, the gel retards or eliminates unwanted water or gas production. It is noted that the gel produced in accordance with the present invention retains its stability when contacted by liquid hydrocarbons within the formation and has a relatively high structural strength. The gel is also stable to contact with high salinity and hardness formation waters. Furthermore, flowing gels produced hereby typically exhibit relatively low mobilities for flow, while non-flowing gels produced hereby typically exhibit a yield pressure greater than injection or production pressures that are commonly encountered during oil production, thereby enabling the gel to remain in place throughout the production life of the subterranean hydrocarbon-bearing formation. The "yield pressure" is defined herein as the maximum pressure that can be applied in a given geometry to the gel before the gel experiences structural failure or substantial structural deformation and begins to flow.

In the practice of other applicable treatments such as coning or squeeze cement treatments, the above-described gelation solution parameters are selected in a manner readily apparent to one skilled in the art to produce a gel satisfying the specific demands of the selected treatment. For example, squeeze cement treatments are often used to shut off formation zones in fluid communication with the well bore, in a manner requiring greater gel strength than many conformance or sweep improvement treatments. Therefore, gels prepared for squeeze cement treatments typically have a substantially greater structural strength and a higher yield pressure than gels prepared for conformance or sweep improvement treatments. Placement of the gelation solution for all treatments embodied within the present invention, however, comprises substantially the same steps of injecting the gelation solution into a well bore and displacing the solution into the treatment region where the gel is formed in situ.

The following examples demonstrate the practice and utility of the present invention, but are not to be construed as limiting the scope thereof.

EXAMPLE 1

Two 25 cm$^3$ samples of gelation solutions are prepared by combining a polymer, a crosslinking agent, and a stabilizing agent in an aqueous solvent. The polymer is polyacrylamide (PA) having a molecular weight of about 5,000,000 and initially having about 2.0% of its amide groups hydrolyzed. The PA concentration of the gelation solution is 2.0% by weight. The crosslinking agent is chromium(III) acetate (CrAc$_3$) and the stabilizing agent is sodium fluoride (NaF). The aqueous solvent is synthetic sea water having a calcium cation concentration of 400 ppm. The first sample has a PA:CrAc$_3$ weight ratio of 20:1 and the second sample has a PA:CrAc$_3$ weight ratio of 28:1. Both samples have an NaF concentration of 6000 ppm. No pH adjustment is performed during preparation of the samples.

The samples are gelled by placing them in individual thick-walled glass ampules. The ampules have an inside diameter of 2.4 cm and an internal height of about 12 cm. Free oxygen is removed from the samples and the ampule interiors prior to sealing the ampules under vacuum with a glass blowing torch. The sealed ampules are placed in an air bath at a temperature of 124° C. and the samples are aged anaerobically for 190 days. While the samples are aging, the ampules are periodically inverted and the strength and stability of the gels are observed as a function of time. Both samples exhibit qualitative characteristics of a moderately deformable nonflowing gel upon complete gelation, wherein the gel surface deforms about halfway to the bottom of the ampule upon inversion, and the samples remain stable and functional for the duration of the aging period.

EXAMPLE 2

Two samples of gelation solutions are prepared in the same manner as Example 1, except no stabilizing agent is added to the gelation solutions of the present example. Both samples become unstable after between 13 to 25 days of aging under the same conditions as Example 1, such that the samples exhibit a high degree of syneresis.

Two additional samples of gelation solutions are prepared in the above-described manner of this Example 2 except that the aqueous solvent is an NaCl brine having the same TDS level, but free of calcium ions. Both samples remain fully stable and functional after aging under the same conditions for the same duration as Example 1.

EXAMPLE 3

Two samples of gelation solutions are prepared by combining a polymer, a crosslinking agent, and a stabilizing agent in an aqueous solvent. The polymer, crosslinking agent and stabilizing agent as well as the polymer concentration are the same as Example 1. The aqueous solvent is a synthetic brine having TDS of 66,000 ppm and a calcium cation concentration of 2200 ppm. The first sample has an NaF concentration of 2000 and the second sample has an NaF concentration of 4000 ppm. Both samples have a PA:$CrAc_3$ weight ratio of 22:1. No pH adjustment is performed during preparation of the samples.

The samples are gelled and aged in the manner of Example 1 at a temperature of 124° C., but for a time of 210 days. Upon inversion of the ampule following complete gelation, the first sample exhibits qualitative characteristics of a moderately to slightly deformable nonflowing gel, wherein the gel surface deforms substantially less than halfway to the bottom of the ampule. The first sample remains stable and functional for the duration of the aging period. Upon inversion of the ampule following complete gelation, the second sample exhibits qualitative characteristics of a moderately flowing ("tonguing") gel, wherein the bulk of the gel flows to the bottom of the ampule, but a small portion of the gel does not readily flow to the bottom. The second sample remains stable and functional for the duration of the aging period.

EXAMPLE 4

Two samples of gelation solutions are prepared in the same manner as Example 3 except no stabilizing agent is added to the gelation solutions of the present example. Both samples become unstable and ineffective gels after aging for 4 days under the same conditions as Example 3, exhibiting a high degree of syneresis.

EXAMPLE 5

A gelation solution sample is prepared by combining a polymer, a crosslinking agent, and a stabilizing agent in an aqueous solvent. The polymer, crosslinking agent, stabilizing agent and aqueous solvent as well as the polymer concentration are the same as Example 1. The sample has an NaF concentration of 800 ppm and a PA:$CrAc_3$ weight ratio of 28:1.

The sample is gelled and aged in the manner of Example 1, but at a temperature of 132° C. and for a time of 210 days. The sample exhibits qualitative characteristics of a moderately deformable nonflowing gel upon complete gelation and the sample remains stable and fully functional for the duration of the aging period.

The results of Examples 1–5 demonstrate that $F^-$ in the form of NaF is an effective stabilizing agent in high temperature environments for Cr(III)/carboxylate crosslinked polymer gels employing a hard calcium ion-containing brine as the aqueous solvent.

While the foregoing preferred embodiments of the invention have been described and shown, it is understood that alternatives and modifications, such as those suggested and others, may be made thereto and fall within the scope of the present invention.

I claim:

1. A process for substantially reducing the permeability of a treatment region in a hydrocarbon-bearing formation below an earthen surface penetrated by a well bore, the process comprising:

a) mixing a gelation solution at an earthen surface including;
      i) a water-soluble crosslinkable polymer,
      ii) a chromium(III) complex having one or more chromium(III) cations and one or more carboxylate anions selected from the group consisting of mono-carboxylates, poly-carboxylates, substituted derivatives of mono-and poly-carboxylates, and mixtures thereof,
      iii) an inorganic fluoride salt, and
      iv) an aqueous solvent containing calcium cations,
   b) injecting said gelation solution into a well bore in fluid communication with a subterranean hydrocarbon-bearing formation;
   c) displacing said gelation solution into a treatment region of said formation; and
   d) gelling said gelation solution in said treatment region to produce a gel that substantially reduces the permeability of said treatment region.

2. The process of claim 1 wherein said gelation solution has a fluoride ion concentration between about 50 and about 30,000 ppm.

3. The process of claim 1 wherein said gelation solution has a fluoride ion concentration between about 100 and about 12,000 ppm.

4. The process of claim 1 wherein said inorganic fluoride salt is selected from the group consisting of NaF, $NH_4F$, KF and mixtures thereof.

5. The process of claim 1 wherein said inorganic fluoride salt is a simple fluoride salt.

6. The process of claim 1 wherein said inorganic fluoride salt is NaF.

7. The process of claim 1 wherein said aqueous solvent has a calcium cation concentration between about 40 and about 60,000 ppm.

8. The process of claim 1 wherein said aqueous solvent has a calcium cation concentration between about 200 and about 10,000 ppm.

9. The process of claim 1 wherein said aqueous solvent is a produced water.

10. The process of claim 1 wherein said aqueous solvent is sea water.

11. The process of claim 1 wherein said crosslinkable polymer is an acrylamide polymer.

12. The process of claim 1 wherein said carboxylate anion is selected from the group consisting of acetate, propionate, lactate, glycolate, malonate and mixtures thereof.

13. The process of claim 1 wherein said treatment region has a temperature of at least about 70° C.

14. The process of claim 1 wherein said treatment region has a temperature between about 80 and about 165° C.

15. The process of claim 1 wherein said treatment region is a fractured formation.

16. The process of claim 1 wherein said gelation solution further includes a gelation-rate retarding agent selected from the group consisting of carboxylic acids, carboxylate salts and mixtures thereof.

17. A gelation solution transformable to a gel in situ for substantially reducing the permeability of a treatment region in a hydrocarbon-bearing formation below an earthen surface penetrated by a well bore, the gelation solution comprising:

a) a water-soluble crosslinkable polymer;
   b) a chromium(III) complex having one or more chromium(III) cations and one or more carboxylate anions selected from the group consisting of mono-carboxylates, poly-carboxylates, substituted derivatives of mono- and poly- carboxylates, and mixtures thereof;

c) an inorganic fluoride salt, and d) an aqueous solvent containing calcium cations.

18. The gelation solution of claim 17 having a fluoride ion concentration between about 50 and about 30,000 ppm.

19. The gelation solution of claim 17 having a fluoride ion concentration between about 100 and about 12,000 ppm.

20. The gelation solution of claim 17 wherein said inorganic fluoride salt is selected from the group consisting of NaF, $NH_4F$, KF and mixtures thereof.

21. The gelation solution of claim 17 wherein said inorganic fluoride salt is a simple fluoride salt.

22. The gelation solution of claim 17 wherein said inorganic fluoride salt is NaF.

23. The gelation solution of claim 17 wherein said aqueous solvent has a calcium cation concentration between about 40 and about 60,000 ppm.

24. The gelation solution of claim 17 wherein said aqueous solvent has a calcium cation concentration between about 200 and about 10,000 ppm.

25. The gelation solution of claim 17 wherein said aqueous solvent is a produced water.

26. The gelation solution of claim 17 wherein said aqueous solvent is sea water.

27. The gelation solution of claim 17 wherein said crosslinkable polymer is an acrylamide polymer.

28. The gelation solution of claim 17 wherein said carboxylate anion is selected from the group consisting of acetate, propionate, lactate, glycolate, malonate and mixtures thereof.

29. The gelation solution of claim 17 further comprising a gelation-rate retarding agent selected from the group consisting of carboxylic acids, carboxylate salts and mixtures thereof.

* * * * *